3,135,580
MAGNESIUM DECABORANE AMMONIA ADDUCT
AND PREPARATION THEREOF
John W. Ager, Jr., Buffalo, N.Y., assignor to Olin
Mathieson Chemical Corporation, a corporation
of Virginia
No Drawing. Filed Sept. 30, 1958, Ser. No. 764,455
2 Claims. (Cl. 23—14)

This invention relates to the preparation of the new adduct, magnesium decaborane ammonia, $$Mg(B_{10}H_{13})_2 \cdot 8NH_3$$

More in particular, this invention relates to the preparation of the magnesium decaborane ammonia adduct by the direct reaction of magnesium and decaborane while they are dissolved in liquid ammonia. The reaction is generally conducted at a temperature of from $-60°$ C. to $+40°$ C., elevated pressures being used when needed to keep the ammonia in liquid phase. The reaction also occurs to some extent when the reactants are melted together in the absence of ammonia. The adducts are white hygroscopic solids.

The magnesium decaborane adducts prepared by the method of this invention can be incorporated with suitable oxidizers such as ammonium perchlorate, potassium perchlorate, sodium perchlorate, lithium perchlorate, aluminum perchlorate, ammonium nitrate, etc., to yield a solid propellant suitable for rocket power plants and other jet propelled devices. Such propellants burn with high flame speeds, have high heats of combustion and are of the high specific impulse type. These magnesium decaborane adducts when incorporated with oxidizers are capable of being formed into a wide variety of grains, tablets and shapes, all with desirable mechanical and chemical properties. Propellants produced by the methods described in this application burn uniformly without disintegration when ignited by conventional means, such as a pyrotechnic type igniter, and are mechanically strong enough to withstand ordinary handling.

*Example I*

In this example, 1.9089 grams of decaborane and 0.1903 gram of magnesium turnings were placed in a 250 ml. three-neck flask. The flask was connected to a fraction cutter of 100 ml. capacity and a "Dry-Ice" cold finger condenser. The apparatus was swept with nitrogen and the reactants heated to incipient melting of the decaborne. After the mixture had cooled to room temperature, 50 ml. of ammonia gas was condensed in the graduated tube of the fraction cutter. Then the liquid ammonia was transferred to the reaction flask which was cooled with "Dry-Ice." The color of the decaborane magnesium mixture immediately changed to yellow. Effervescence and solution of the magnesium proceeded for approximately one hour in the presence of the refluxing ammonia. Then the ammonia was allowed to evaporate. A dry, white solid residue remained in the flask. No unreacted magnesium was visible. The solids were maintained at a pressure of less than 1 mm. of mercury absolute for approximately two hours and a half, then weighed and again placed under vacuum for an additional two hours. During this additional two hours, they lost 0.073 gram. The solids were pulverized then maintained under vacuum in a 70°–80° C. water bath for two more hours. The solids became yellow and seemed to evolve a gas. During this time, they lost 0.133 gram. An analysis of a 0.877 gram sample removed from the trap showed that it contained 54.0, 54.2 percent boron and 6.53, 6.37 percent magnesium.

This analysis compares favorably for the calculated analysis of $Mg(B_{10}H_{13})_2 \cdot 8NH_3$ which contains 53.4 percent boron and 5.83 percent magnesium.

The solids remaining in the trap after removal of the 0.877 gram sample for analysis, were placed in a silicon oil bath maintained at 124° to 130° C. under vacuum for approximately two hours. A further loss of gas was noted. A 0.636 gram sample removed from the trap contained 57.8, 58.1 percent boron, 7.15, 7.24 percent magnesium, 13.0 percent nitrogen and 10.8 percent hydrogen. The loss of weight during the two hours of heating at 125° to 130° C. was 0.193 gram.

Distilled water, 15 ml., was added to the 0.95 gram residue remaining in the trap. The pH of this solution after approximately 10 minutes was 9.9.

*Example II*

This example was conducted in the same general manner and in the same apparatus described in Example I. Decaborane, 4.0 grams, was reacted with 0.4 gram of magnesium in liquid ammonia. The reaction was allowed to go to completion and the ammonia evaporated overnight. The white residue was placed in a vacuum desiccator containing sulphuric acid for two days. An elemental analysis of this solid showed that it contained 53.9, 53.8 percent boron, 6.07, 6.05 percent magnesium and 31.0, 30.6 nitrogen. An infrared analysis of the solid showed that it contained NH and/or $NH_2$ bands plus additional OH and B—H bonds. These analyses indicate that the product obtained was $Mg(B_{10}H_{13})_2 \cdot 8NH_3$. The calculated nitrogen content of this compound is 27.18 percent compared with the 30.8 percent obtained.

*Example III*

Ten grams of purified decaborane and 0.95 gram of magnesium turnings were placed in a 300 ml. three-neck flask which was flushed with nitrogen. Heat was applied to melt the decaborane. The flask was cooled in "Dry-Ice" and 110 ml. of ammonia was admitted to the flask. Stirring was begun and the initial yellow color changed to white after a few minutes. After about 40 minutes, the ammonia was allowed to evaporate and the solids subjected to vacuum pumping for 4 hours at room temperature. Then the solids were transferred to a 300 ml. distilling flask and connected to a vacuum system. The flask containing the solids was placed in a hot oil bath and maintained at 120° C. for 4 hours. The solid material recovered after this heating weighed 15.334 grams. The solids were returned to the flask and maintained for an additional 3 hours at 120° C. at less than 1 mm. mercury absolute pressure. An additional 0.041 gram was lost. The solids were then ground in a mortar and transferred to a tared bottle and weighed 15.23 grams, 0.063 gram handling loss.

This magnesium decaborane product contained 54.6 percent boron and 6.12 percent magnesium.

*Example IV*

This reaction of magnesium and decaborane was performed in the usual manner. Decaborane, 1.909 grams, and magnesium, 0.19 gram, were mixed in introgen atmosphere and heated to incipient melting of the decaborane. Liquid ammonia, approximately 50 ml., was added to the cooled reaction flask and the characteristic yellow color was observed. The magnesium dissolved with the evolution of gas in about 1 hour. Then the ammonia was allowed to evaporate. Solids were dried under reduced pressure for several hours at 30° to 80° C. The resultant product contained 6.5 percent magnesium, 54.1 percent boron.

Additional heating at 125° to 130° C. in vacuum yielded additional vapor. The analysis of the product after this additional heating showed that it contained 7.2 percent magnesium, 58.0 percent boron, 13.0 percent nitrogen, 10.8 percent hydrogen and 1.9 percent carbon for a total elemental analysis of 90.9 percent. Some ammonia was still present in the final product which weighed 2.48 grams.

The boron-containing solid material produced by practicing the method of this invention can be employed as an ingredient of solid propellant compositions in accordance with general procedures which are well-understood in the art, inasmuch as the solids produced by practicing the present process are readily oxidized using conventional solid oxidizers, such as ammonium perchlorate, potassium perchlorate, sodium perchlorate, ammonium nitrate and the like. In formulating a solid propellant composition employing these magnesium decaborane products, generally from 10 to 35 parts by weight of boron-containing material and from 65 to 90 parts by weight of oxidizer, such as ammonium perchlorate, are present in the final propellant composition. In the propellant, the oxidizer and the product of the present process are formulated in intimate admixture with each other, as by finely subdividing each of the materials separately and thereafter intimately admixing them. The purpose in doing this, as the art is aware, is to provide proper burning characteristics in the final propellant. In addition to the oxidizer and the oxidizable material, the final propellant can also contain a binder such as an artificial resin, generally of the urea-formaldehyde or phenol-formaldehyde type, or an artificial rubber like substance, the function of the binder being to give the propellant mechanical strength and at the same time improve its burning characteristics. Thus, in manufacturing a suitable propellant proper proportions of finely divided oxidizer and finely divided magnesium decaborane product can be admixed with a suitable binder, the proportions being such that the amount of the binder is about 5 to 10 percent by weight, based upon the weight of the oxidizer and the magnesium decaborane product. The ingredients are thoroughly mixed and following this the mixture is molded into the desired shape, as by extrusion. Thereafter, the binder can be cured by resorting to heating at moderate temperatures. For further information concerning the formulation of solid propellant compositions, reference is made to U.S. Patent No. 2,622,277 to Bonnell et al. and U.S. Patent No. 2,646,596 to Thomas et al.

The following example illustrates solid propellant compositions containing the magnesium decaborane ammonia adducts of this invention.

*Example V*

The magnesium decaborane ammonia adduct of Example I is admixed with the following materials in the amounts shown.

| | Parts | Grams |
|---|---|---|
| Liquid polybutadiene (vis.=360 Saybolt Furol sec. at 210° F.) | 100 | 1.63 |
| "Butyl Eight"[1] | 5 | 0.081 |
| Ethyl Selenac[2] | 3 | |
| Sulfur | 3 | 0.179 |
| Zinc oxide | 5 | |
| Triethylamine | 1 | 0.016 |
| | | 1.906 |
| Magnesium decaborane product | | 1.00 |
| | | 2.906 |

[1] A dithiocarbamate type special purpose accelerator marketed by R. T. Vanderbilt.
[2] Selenium diethyldithiocarbamate standard accelerator also marketed by R. T. Vanderbilt.

To this mixture is added 8.70 grams of ammonium perchlorate. A crumbly mass is obtained which is moldable. When placed into the molds, it holds its shape and flows under pressure. The mass is cured at 80° C. for approximately 4 hours.

The molded slabs are removed and allowed to cool. Some elasticity is present. The molded slabs are homogeneous, contain no gas bubbles and are yellow. The specific gravity is about 1.23 at room temperature using hydrostatic weighing.

In place of the polybutadiene employed above, there can be used instead a butadiene-acrylic acid copolymer having a viscosity of about 150 to 500 Saybolt Furol seconds at 210° F.

I claim:

1. A method for the preparation of a magnesium decaborane ammonia adduct which comprises reacting magnesium metal and decaborane at a temperature of from −60° to +40° C. while the reactants are dissolved in liquid ammonia and thereafter recovering the adduct from the reaction mixture.

2. A composition of the formula $Mg(B_{10}H_{13})_2 \cdot 8NH_3$.

References Cited in the file of this patent

Stock: "Hydrides of Boron and Silicon," page 127 (1935), Cornell University Press.

Stock et al.: "Z. anorg. allgem. Chem.," vol. 228, pages 178–192 (1936).

Siegel et al.: "J. Am. Chem. Soc.," vol. 80, pages 4523–4526, Sept. 5, 1958.